Figure 1:
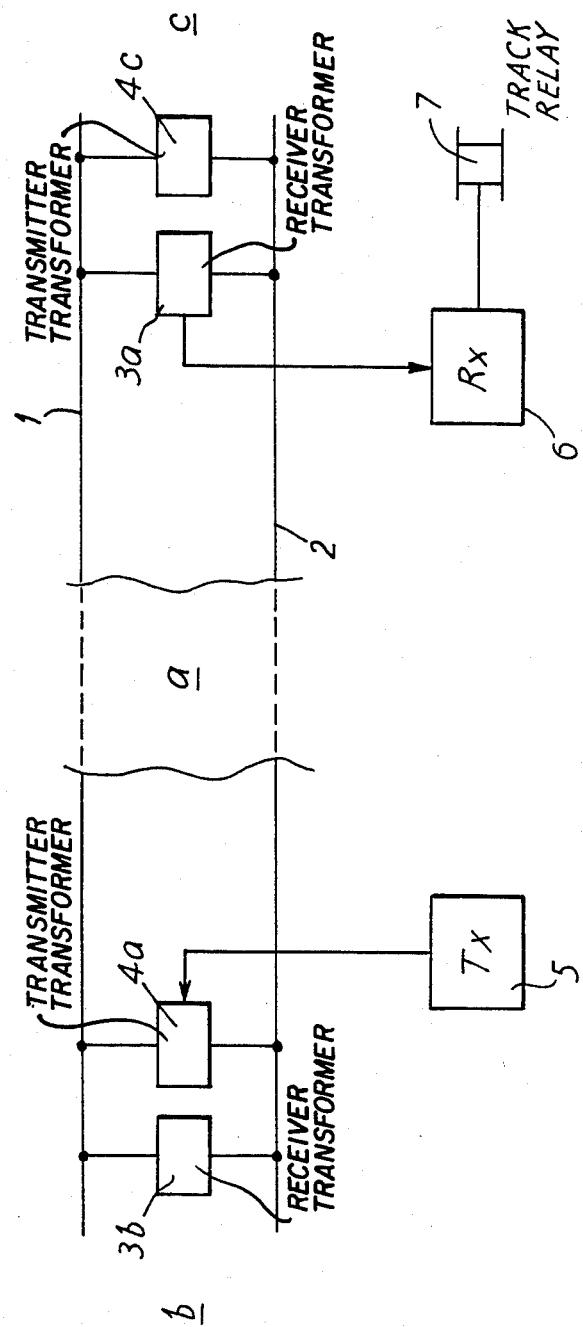

United States Patent [19]

Cook et al.

[11] Patent Number: 4,516,249
[45] Date of Patent: May 7, 1985

[54] RAILWAY SIGNALLING RECEIVER

[75] Inventors: Andrew J. Cook, Chippenham; Paul D. Negus, Bath, both of England

[73] Assignee: Westinghouse Brake & Signal Co. Ltd., Chippenham, England

[21] Appl. No.: 450,459

[22] Filed: Dec. 16, 1982

[30] Foreign Application Priority Data

Dec. 22, 1981 [GB] United Kingdom ............... 8138634
Aug. 18, 1982 [GB] United Kingdom ............... 8223767

[51] Int. Cl.³ .......................................... H03D 3/18
[52] U.S. Cl. .................................... 375/82; 364/726; 375/96; 246/5; 246/34 R
[58] Field of Search ............... 375/82, 88, 90, 96, 375/99, 103; 364/485, 514, 572, 576, 604, 724, 364/726, 827; 343/5 FT, 5 SA; 246/30, 4, 5, 28 R, 246/34 R, 34 B, 167 R

[56] References Cited

U.S. PATENT DOCUMENTS

| | | | |
|---|---|---|---|
| 3,268,727 | 8/1966 | Shepard | 246/5 |
| 3,871,302 | 3/1975 | Jamison et al. | 246/30 |
| 3,891,803 | 6/1975 | Daguet et al. | 370/23 |
| 4,245,325 | 1/1981 | Kikuchi et al. | 364/724 |
| 4,298,985 | 11/1981 | Ballard et al. | 375/82 |
| 4,352,475 | 10/1982 | Smith et al. | 246/34 R |

FOREIGN PATENT DOCUMENTS 112056 8/1980 Japan ................................. 370/23

Primary Examiner—Benedict V. Safourek
Attorney, Agent, or Firm—Larson and Taylor

[57] ABSTRACT

A railway signalling receiver in which a signal carried by the railway lines is sensed and the sensed signal is sampled, digitized and subjected to a discrete Fourier transform operation which transform the time domain samples into the frequency domain. The frequency content of the signal may then be examined in order to identify the original signal or to decode the information carried. The signal may be a frequency shift keyed carrier signal. A technique of maintaining the safety of the system by discriminating against potentially confusingly similar ASK signals, which can arise spontaneously in electric traction territories, is described. A technique of digitally heterodyning down a carrier signal so that the transform operates on the lower sidebands frequencies in order to maximize efficiency of the transform calculations is also described. The receiver is useful as a jointless track circuit receiver and also in a part of the train borne equipment of an automatic train protection system.

6 Claims, 5 Drawing Figures

RAILWAY SIGNALLING RECEIVER

The present invention relates to a railway signalling receiver for electrical signals carried by railway lines, which receiver performs a discrete Fourier transform. Such a receiver is useful, for example, for track circuit signals utilised for determining the presence and location of trains and automatic train protection systems which relay safe maximum speed information to moving trains.

Discrete Fourier Transform techniques provide a quantitative analysis of the frequency spectrum of signal by sampling the signal in the time domain and transforming those time-domain samples into the frequency domain. The process involves the collection of a set of time domain data samples which form an initial set of data points, a multiplicity of elementary calculations are then carried out to produce a new set of intermediate results and proceeding through a series of levels or iterations to a final new set of outputs results in the frequency domain.

The initial set of data samples have real values in the time domain and the final set of results have real values in the frequency domain although the intermediate results may well be complex. However there is a substantial amount of redundancy among these intermediate terms due to the periodicity exhibited by the exponential function in the transform equation.

In order to reduce the number of individual calculations involved in the transformation to a realistic level various algorithms or families of algorithms have been proposed. The Winogrand algorithm is one, another is the Cooley-Tukey algorithm and another is Bergland's algorithm, which is a modification based on the Cooley-Tukey, and with which the particular examples described below will be concerned.

As in other fields discrimination against noise and interference is a constantly present problem which if not effectively dealt with in the railway context can seriously affect the safety of the railway system. Analogue electronic equipment designs possess the inherent disadvantage that "universal designs" are difficult if not impossible to achieve so that each application requires at least freshly calculated design values. Also they are liable to drift with temperature and age and each set of equipment needs individual alignment initially which is a time consuming and costly procedure.

Objects of the present invention include providing equipment which in addition to overcoming these difficulties is useful in different systems with different operating parameters but requires minimum modification and is useful as the basis of equipment for different purposes to which specialised peripheral items may be connected.

According to the present invention there is provided a railway signalling receiver for electrical signals carried by railway lines comprising sensing means co-operating with the railway lines to sense the signals, sampling means operative in the time domain to continuously sample a sensed signal, data memory means for storing a plurality of sample values, means for performing a discrete Fourier transform on said stored sample values, data memory means for storing the results of the transformation and, means responsive to the final results of the transformation in the frequency domain to identify the sensed signal.

In such apparatus for receiving and detecting a frequency shift keyed transmission the receiver is connected to a heterodyne circuit, a low-pass filter means is arranged to pass the difference frequency components and to exclude the sum frequency components in the heterodyned output which is connected to the means for performing a discrete Fourier transform on said difference frequency components.

In one application of the invention to a railway jointless track circuit receiver, a combination of alternative carrier frequencies are employed as an identification signal by the associated track circuit transmitter thus defining between them the track section. The modulation frequency may be employed as an additional identification further increasing the number of possible track circuit identifying combinations or, as a means of encoding, for example, a maximum speed limit for transmission to a train in the track section.

In another application of the invention to an automatic train protection system a carrier signal is modulated by a speed limit designating signal and is communicated to a train, on board the train the signal is sensed and sampled, the sample values are temporarily stored and used as input values for a discrete Fourier transform process, the final results of which yield, inter alia, the modulation frequency which indicates a speed limit.

Figure 2:
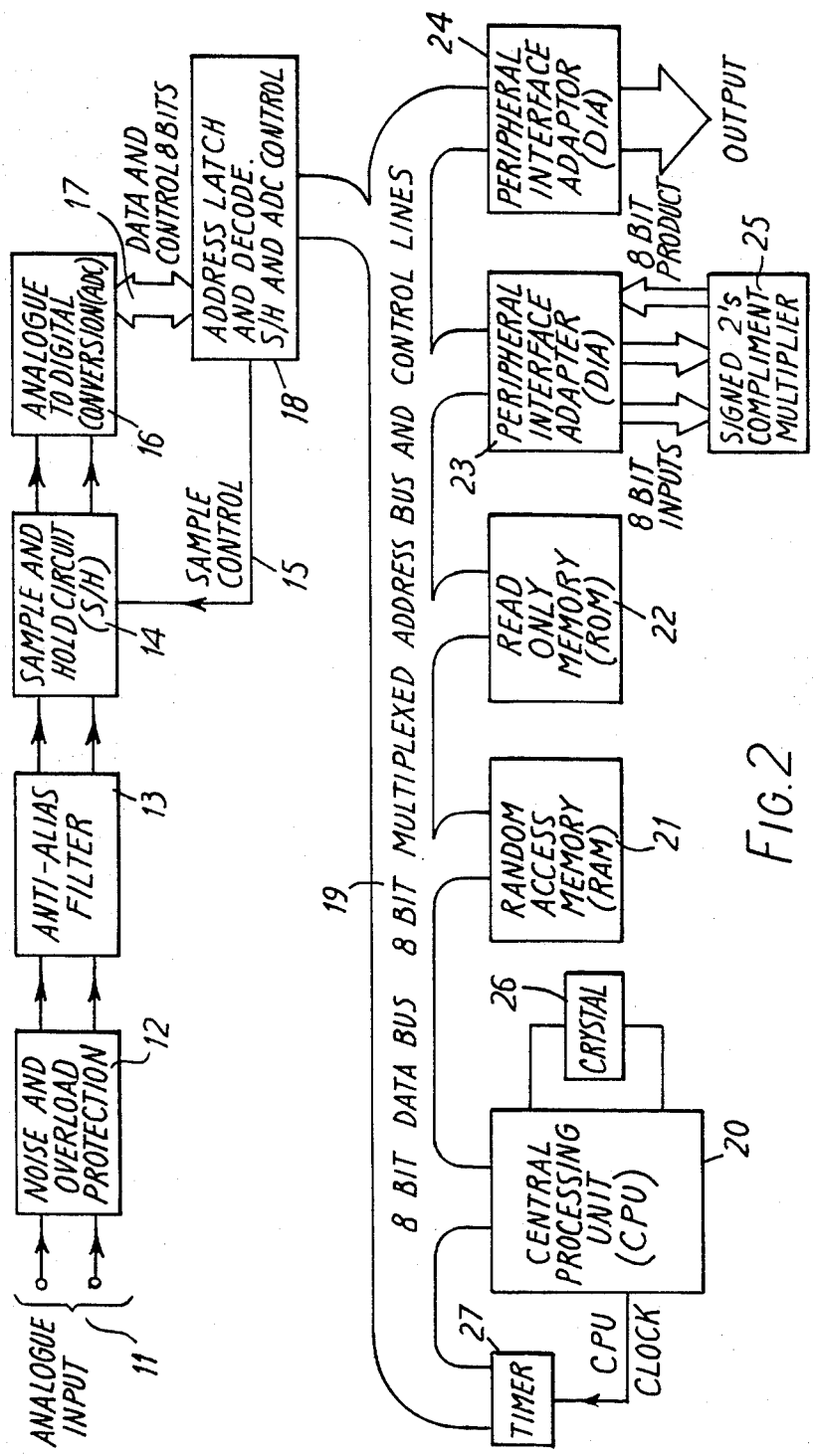
Figure 3:
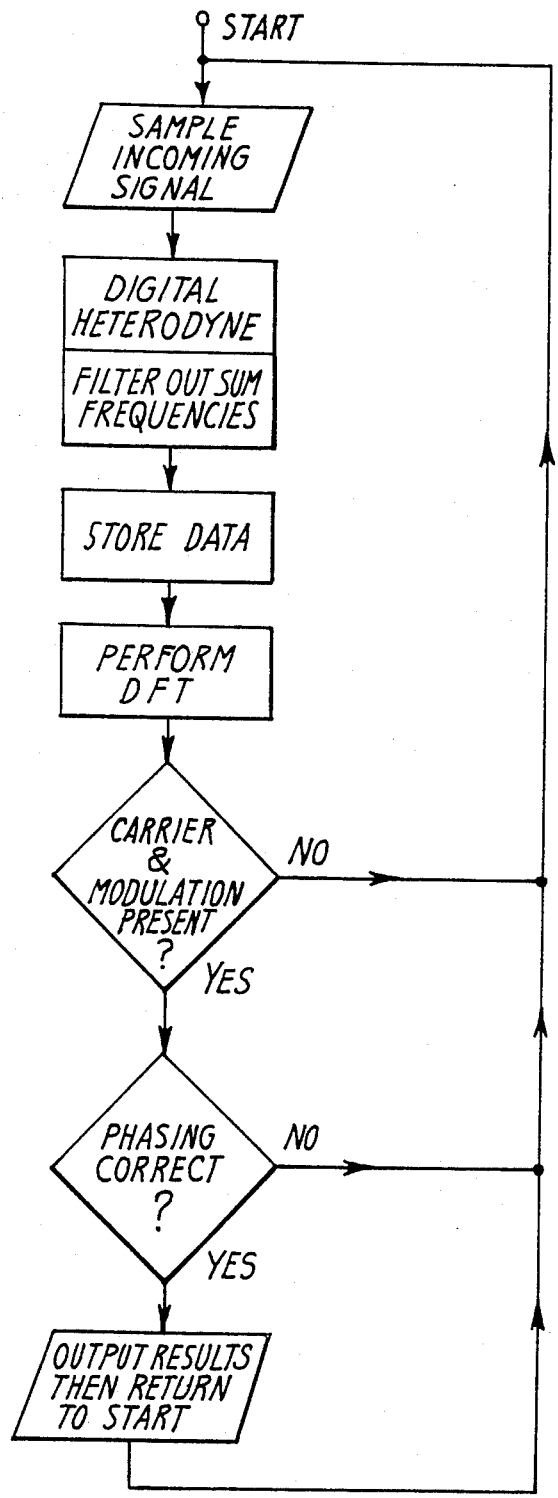
Figure 4:
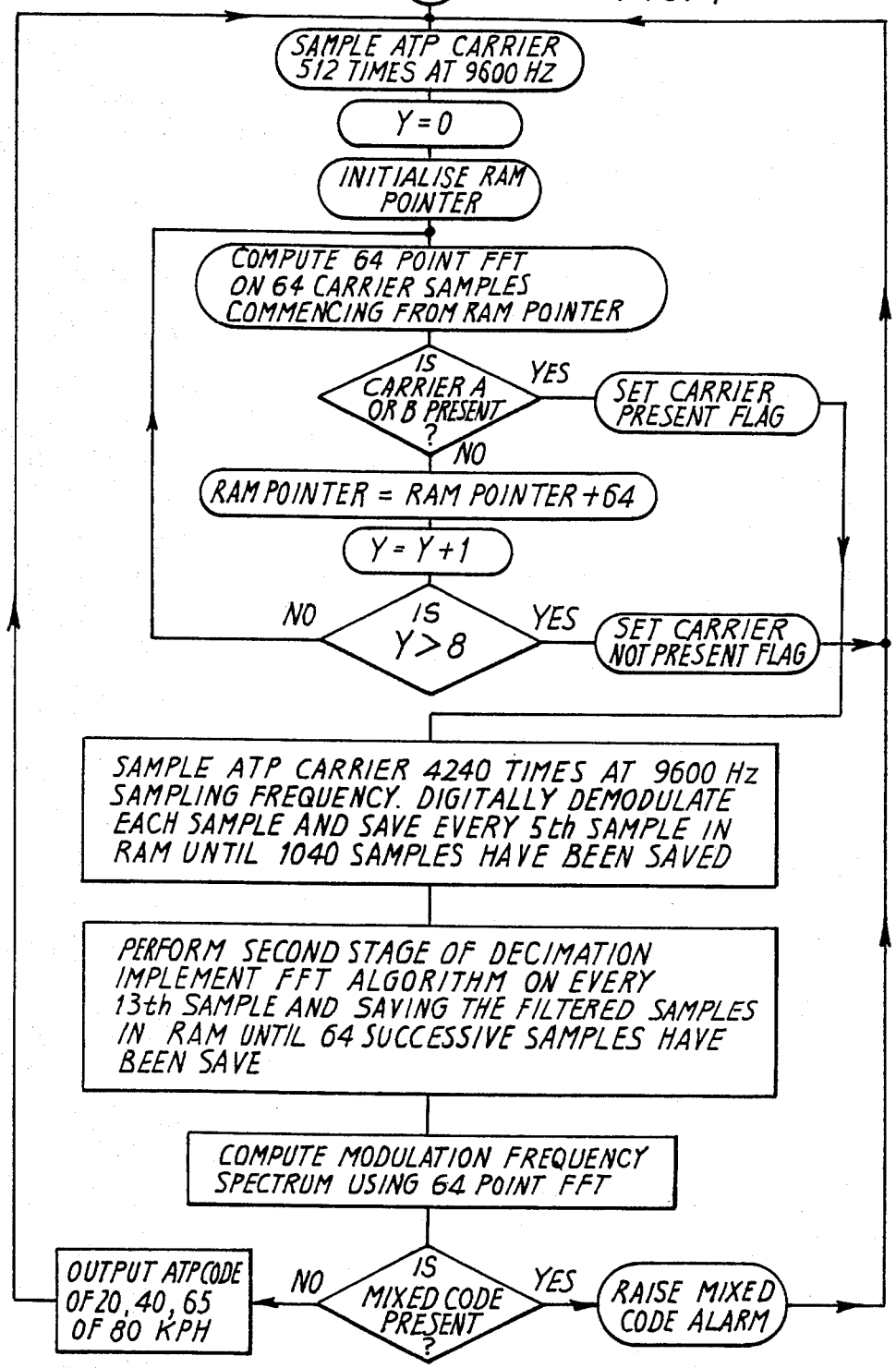
Figure 5:
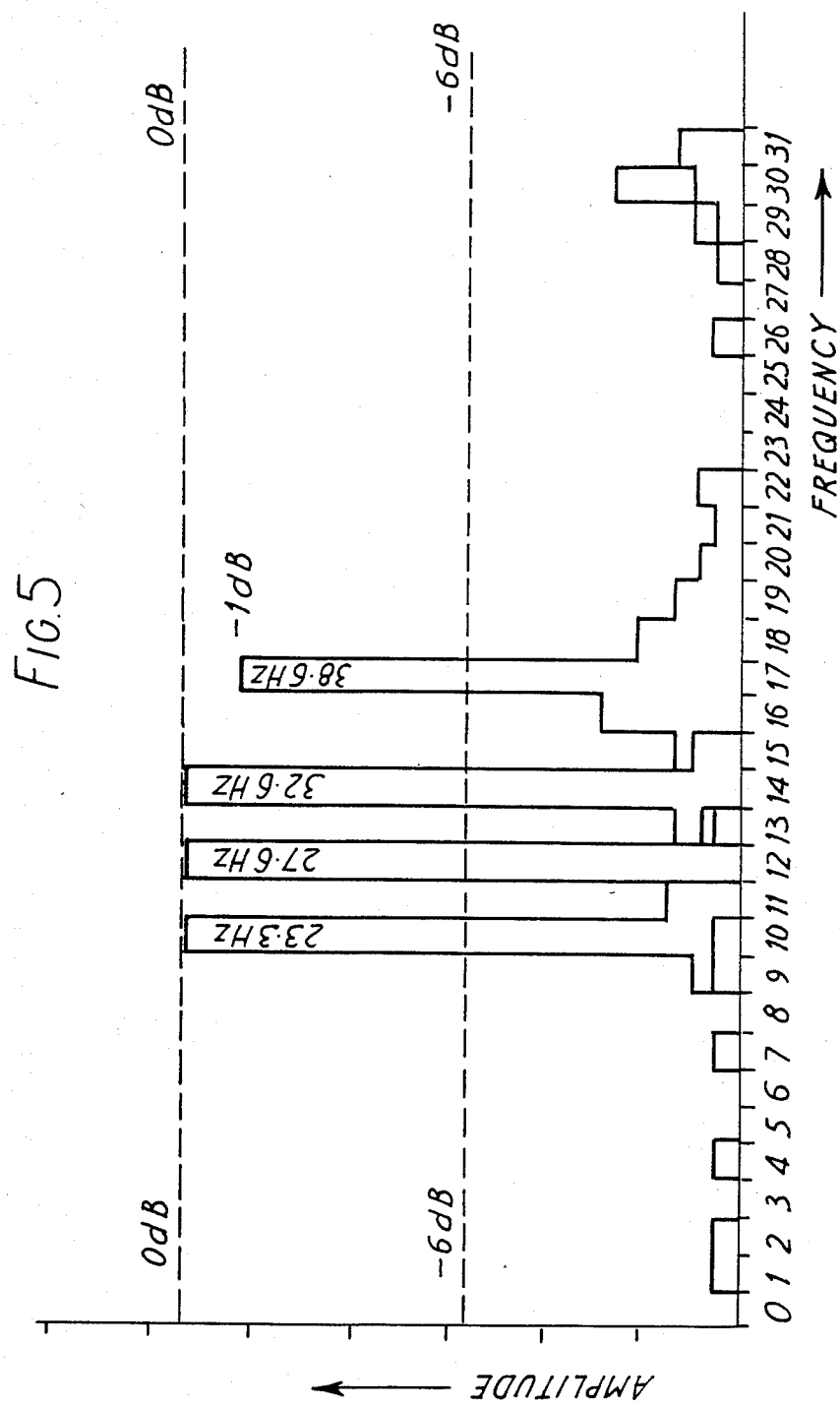

The invention, and how it may be carried into practice, will now be described by way of example with reference to the accompanying drawings, in which:

FIG. 1 shows a schematic diagram of a jointless track circuit,

FIG. 2 shows a block diagram of apparatus according to the invention for performing a discrete Fourier transform to identify a received signal, FIG. 3 shows a flow chart of the operational cycle of the apparatus of FIG. 2 used in a track circuit receiver, FIG. 4 shows a flow chart of the operational cycle of the apparatus of FIG. 2 used in an Automatic Train Protection System, FIG. 5 shows a graphic representation of the frequency domain output of the discrete Fourier transform apparatus in an A.T.P. system.

The present invention utilizes one of the most efficient discrete Fourier transform algorithms so far proposed, i.e. that by Cooley and Tukey which can be found published in "Mathematical Computing 19 (April 1965)." A further refinement of this algorithm which has been found particularly useful with real-valued series was subsequently described by Bergland in "Communications of the ACM (Vol. 11, No. 10 October 1968)." The algorithm takes as an initial input a real-valued time series comprising the N discrete sample values and, through a series of iterations which makes repeated use of a standardised calculation, computes the real and imaginary parts of the final Fourier coefficients of (N/2) frequency terms. Full theoretical descriptions of these algorithms can be found elsewhere, as noted above, and reference should be had to these publications for rigorous exposition of the theoretical basis of the algorithms.

The process of evaluating the Discrete Fourier Transform according to the Cooley-Tukey algorithm involves setting-up an initial array of data points, in time sequential or natural order. The algorithm then proceeds to calculate successive arrays in a series of iterations until eventually the final level array is obtained in which the calculated frequency domain results are in a scrambled order. All of the intermediate data calculated for the intermediate iteration and final arrays are the result of computations using only two data values from the previous array. The operation to simultaneously calculate two data points in one level array from two data points in the preceding level array is known as a "butterfly" computation. This "butterfly" operation is a relatively trivial computation and is easily carried by a digital processing unit, e.g. a microprocessor appropriately programmed. The two results of the "butterfly" operation have the corresponding array locations as the input data points and as each is only used once it is convenient to write the results back into the same memory address locations thus, saving greatly on memory size. It is not intended to give further or more detailed mathematical analysis of Fast Fourier Transforms here but, the manner in which these basic tools are adapted and applied in practical use in embodiments of the invention will be described below.

Referring now to the accompanying drawings, FIG. 1 shows for a first example a schematic diagram of a jointless track circuit in which the running rails are referenced at 1 and 2 and track circuit receiver and transmitter transformers 3a and 4a, respectively, are connected between the rails 1, 2, at some distance apart, thereby defining the track section a monitored by the completed track circuit. Transformer units 3b and 4c, which form part of the track circuits of track sections b and c on either side of track section a, are connected adjacent transformers 4a and 3a, respectively, at a relatively short distance therefrom. The theory and practical design and positioning of these track circuit transformers is well-understood in the art and for present purposes the units referred to will be assumed to be according to the prior art.

The transmitted signal comprises a Frequency Shift-Keyed (FSK) signal employing up to four carrier frequencies at 1700, 2000, 2300 AND 2600 Hz, with up to ten low frequency modulation rates, in this example there are three modulation rates at 12.5, 15.0 and 20.0 Hz. The chosen combination of keyed carrier frequencies identify a particular track section/circuit, that is, a particular pair of track circuit transmitters and receivers is arranged to operate with a particular combination of carrier frequencies. This does not permit a large number of track circuit identifications, but does ensure that two track sections having the same identification are sufficiently far apart to prevent any possibility of the receiver in one section "picking-up" and positively responding to the transmitter in another and wrong section.

The transmitter 5 feeding into the track section through transformer 4a in FIG. 4, may thus be of such known type according to the prior art and will not be further described.

At the opposite end of the section, the transformer 3a feeds the FSK signal into a track circuit receiver 6 which "detects" the signal in a safe manner and energises track section relay 7 providing the signal is present and correct.

FIG. 2 shows in block diagram form the hardware of the track circuit receiver 6 comprising at 11 a pair of analogue input terminals to which the received track circuit signal is connected. The input signal path feeds through a noise and overload protection circuit 12 through an anti-alias filter 13 comprising a low-pass analogue filter, the object of which is to eliminate signals above half the Nyquist frequency of fs/2.

The theoretical dynamic detection range of the receiver is 42 dB but is restricted to 30 dB by digital noise arising in the arithmetic processing of the FFT. Thus anti-alias filter 13 has a flat transfer characteristic from DC to 2 KHz which then falls by more than $-30$ dB at 5 kHz so that no signals above half the sampling frequency will be detected.

The input signal is then fed to a sample and hold circuit 14, operated by a sample control signal on line 15, for sampling in the time domain at a frequency of 9.6 kHz. Sampled values are then digitised by an 8-bit analogue to digital converter 16. The 8-bit binary output of the converter gives a lowest detectable amplitude of (1/428th) (or $=42$ dB) of the highest amplitude, thus providing the receiver with its previously mentioned dynamic range of 42 dB.

Converter 16 generates eight parallel binary digital data bits at its output 17 which has to be "logged", i.e. temporarily stored, for later retrieval in preparation for evaluation of the FFT algorithm. The parallel data is received by digital input and address latch circuit 18 the output of which feeds into an 8-bit parallel multiplexed data bus 19 which interconnects a microprocessor Central Processing Unit (CPU) 20 and various co-operating units (11, 12, 13, 14 and 17.) The sampled data is "logged" in a Random Access Memory (RAM) 21. The control program for controlling operation of the CPU 20 is stored in a Read Only Memory (ROM) 22.

Also connected to the data bus 19 are two peripheral interface adaptors 23 and 24, the former providing an interface with a "signed 2's Complement Multiplier" 25 which is used to perform multiplications at the command of CPU 20 during execution of the FFT algorithm. The interface 24 is that through which the final digital output is delivered. The operating frequency of the CPU is derived from a crystal oscillator 26 resonant at 6.147 MHz. The timing signals which control operation and synchronisation of all the co-operating units is provided by timer 27 via the multiplexed databus 29. This also controls operation of the sample and hold circuit 24 through control signal 25 and also operation of the A to D converter 26 and address latch 28.

The control program stored in ROM 22 is directly written as a set of program instructions in "machine code" thus making it possible for the programmer to compose the program instructions so as to execute the FFT algorithm in the most efficient way possible having regard for the capabilities and restrictions of the particular microprocessor.

The programmable read-only memory 22 contains a set of digital instructions specifically adapted to control the microprocessor in a sequence of operations which, when taken as a whole and in sequence, implement a discrete Fourier transform on the analogue input signal 11.

In a complete cycle of operations in one such transform, the digitised waveform samples are stored and used as data-points in an initial level of calculations, the results of these calculations then form the data-points for a further level of calculations. This process is repeated several times through a succession of intermediate levels of calculation which descend to the final set of results in the completed transformation. As the initial samples and each level of results are only used in the next level of calculations, only one memory, 21, is used as temporary storage which need only be large enough to store the largest amount of data produced in any one level. Thus, data is discarded when no longer further required. Finally, the final results of the discrete Fourier transform are read-out through output circuits, generally referenced at 24.

The discrete Fourier transform effectively poduces, as a final result, a digitised spectrum analysis of the received input waveform 11. When correctly interpreted, the final set of output data points represents a measure of the component frequencies of adjacent "frequency bins" spanning a frequency spectrum starting at 0 Hz. The required signal detection is achieved by monitoring or applying a discrimination function to the appropriate frequency bin. The lowest frequency component in the output results of a Fourier transform has to be zero Hertz. For the detection of FSK signals the need to detect a relatively high frequency has thus required a large number of samples and very long computation times in order to achieve adequate frequency resolution. A smaller number of samples speeds-up the computations, but causes a consequent loss of frequency resolution. Therefore, the transforms have usually been performed "at leisure" on recorded data rather than "in real time".

To overcome this problem the FSK input signal is "heterodyned down" to produce a lower intermediate frequency sideband at very low frequencies, which sideband is then operated upon by the discrete Fourier transform to produce the required spectrum analysis to enable "detection" of the original carrier and modulation frequencies to be carried out. FIG. 3 shows a flow chart of the sequence of events in this operation.

In the particular embodiment being described, the "heterodyning" operation is carried out digitally by steps described below. The received track circuit signal is modulated by frequency shift-keying, therefore, it contains a band of frequencies centred about the carrier frequency fc. The input signal is passed through an input noise filter, of band-pass type, which has the effect of limiting the frequencies present to a well-defined band.

Consider an example in which a carrier frequency fc of nominally 1600 Hz. is keyed between 1600 Hz.±10 Hz. at a modulation rate of 12.5 Hz., 15.0 Hz., or 20.0 Hz. In this example, where the modulation index is less than 1, it can be shown that the signal frequency spectrum consists of a component at fc (1600 Hz.) and pairs of sidebands spaced at multiples of the modulation frequency fm e.g., if fm=20 Hz., the sidebands are 1600±40 Hz. etc. the amplitudes of the higher order sidebands decrease progressively away from the centre frequency in accordance with values predicted by Bessel function mathematics. Frequency resolution, i.e. $\Delta f$, must be 2.5 Hz. or better, in order to provide discrimination between sidebands at 12.5 Hz. and 15.0 Hs. Siebands of higher order than the first are attenuated by the track bonds; sampling theory specifies that the minimum sampling frequency can be twice the highest frequency component, so that: $f_{max}$=1600+20.0 Hz.=1620 Hz:
therefore: fs=2.$f_{max}$=3240 Hz. Also, if $\Delta f$ is the Fourier frequency bin width and N is the number of transform points, then, fs=N.$\Delta f$ and N=3240/2.5=1296. Thus, if the input waveform is operated on directly, then a minimum of 1296 transform points has to be calculated, and computation time of the discrete Fourier transform is proportional to $N.^2 log_2 N$ but the FFT algorithm is proportional to $N.log_2 N$.

However, if a heterodyne operation is carried out using a local oscillator frequency fh of 1280, then in the difference frequencies sideband fc−fh=1600 Hz.−1280 Hz.=320 Hz. The highest frequency present is now 320 Hz.+20 Hz. with yields fs=680 Hz. and N=272. Therefore, the computation time for a transform of the heterodyned waveform with the same frequency resolution is considerably less than for a transform of the unmodified input waveform.

A digital heterodyning operation is accomplished by multiplying the sampled input waveform with a sampled equivalent of the local oscillator frequency. By specifying a local oscillator signal having a cosine waveform and a frequency exactly four times the digital sampling rate, the samples input signal can be digitally heterodyned merely by multiplying each sample by the appropriate co-efficient of the cosine waveform. A normalised waveform may be assumed for the simplest mujltiplication that is, the first sample is multiplied by +1, the second sample is set to zero, the third sample multiplied by −1, the fourth sample is set to zero, and the cycle is repeated again and again in that sequence. The operations involving +1 and −1 are trivial multiplications, that is, for multiplication by +1, the sample is unaltered, and for multiplication by −1, only the sign is changed. The calculated values of those heterodyned samples are then stored in the temporary memory 27 ready for use in the discrete Fourier transform. When completed, these results represent the levels of frequency components found in each of the corresponding frequency bins. By applying a straightforward amplitude discriminator or threshold detector to each bin, in turn, the frequency profile of a received input waveform can be checked for presence of carrier and modulation frequencies at the end of each complete transform cycle.

One of the dangers in safety equipment employing signal transmissions which has to be guarded against is accidental interference from other sources. One type of interfering signal difficult to discriminate against in this class of system is the Amplitude Shift Keyed, or ASK, signal which may be generated by some types of electric-driven train traction control equipment and, as the running rails can be used as earth return, the additional current is superimposed on the track circuit signal. A problem arises because the spectral response of an ASK signal and confusion can arise when the amplitude of the received input signal is variable so that despite the differences between ASK and FSK signals of the sideband to carrier amplitude ratio it may not always be certain which is received. One way of distinguishing between the two signals is therefore to measure the ratio of the carrier and sideband amplitudes.

However, there is another difference between the signals, which is potentially more reliably detected. In the FSK signal the sideband vectors always produce a resultant orthogonal with respect to the carrier vector, in contrast, in the ASK signal, the sideband vectors produce a resultant in-phase or anti-phase with the carrier vector. The final results yielded by the Fourier analysis contain both phase and amplitude information for all frequency components. Thus, by using trigonometric formulae, the angle of a sideband resultant vector can be calculated.

So, as a final safety check, the magnitude of the resultants are calculated from the final Fourier transform results; if the resultant is too small (so that errors are no longer insignificant), the results may be inverted and the "opposite" vector calculated; the angle information is calculated and a discrimination check applied to positively locate an FSK signal. If this check fails, then it is assumed that the received signal is ASK and the calculated information is rejected, that is, the track circuit receiver reacts as if no track circuit signal was received and the track relay is de-energised.

In a second embodiment the invention forms part of an Automatic Train Protection (hereinafter ATP) system which involves the transmission to a moving train of a frequency signal which represents a maximum safe speed limit, the comparison of the actual train speed with that limit and, if it is exceeded, automatic operation of the train's brakes. Speed limit information is transmitted to the train by means of amplitude-modulated carrier signals in which the speed limit signals are used as carrier modulators. Prior art ATP systems have employed analogue filters for decoding the ATP signal but these require one filter for each frequency signal of interest. This embodiment of the inention is effectively an FFT digital filter of non-recursive type, i.e. it has an open loop design which processes only sampled values of an input waveform. Execution of single FFT algorithm performs all the code frequency filtering required. As with analogue filters, a digital filter of recursive type would be required for each code and carrier frequency as feedback techniques are employed to sample both input and output waveforms and the filters are only conditionally stable in similar manner to linear amplifiers employing feedback.

In the non-recursive filter the same FFT algorithm is used to process different frequency allocations in different ATP systems with only minor changes to the software. Thus, the digital filter hardware described below is suitable for quantity production. The same basic hardware illustrated in FIG. 2 is used with differences only in the software program contained in the Read only Memory 22.

The ATP digital filter has to perform two functions, as outlined in the flow chart of FIG. 4. Firstly it has to determine that a received carrier signal is within its permitted frequency band and above minimum threshold amplitude and, second that there is a code modulation signal present, it is above minimum threshold amplitude, what is its frequency and, that there is only one modulation signal present. In the arrangement being described the carrier signal has a frequency of 1953 Hz. and there are four alternative modulation codes as follows:

Code 1 = 23.3 Hz representing 15 Kph
Code 2 = 27.6 Hz representing 40 Kph
Code 3 = 32.6 Hz representing 65 Kph
Code 4 = 38.6 Hz representing 80 Kph.

A carrier frequency resolution of approximately 150 Hz is demanded of the system: Shannon's sampling theorem suggests a minimum sampling frequency equal to twice the highest frequency component and, in practice four or five times is found to be advisable. Thus for a carrier frequency of about 2 KHz a sampling frequency of 9.6 KHz was chosen. To achieve a frequency resolution $\Delta$of of 150 Hz with a sampling frequency fs of 9.6 KHz the number N of time domain sample in the FFT must be therefore, $N = f_s/\Delta f = 64$. As the FFT algorithm is a radix 2 algorithm the number of samples has to be a binary multiple number. In view of the close spacing the code frequencies a code frequency resolution capability of approximately 2.5 Hz is necessary. The filter being described is intended for use in an existing ATP system, in a completely fresh design the code frequencies could be more conveniently chosen.

Also in order to achieve minimum computation time and maximum efficiency it is preferably to use the same FFT algorithm and, as far as possible, the same sampled data points. By using every 65th sample starting with the first sample all 64 samples for use in the FFT are collected in a total sample acquisition time of 442 mS.

With reference to operation of the digital filter the sequence of events of one operational cycle is illustrated by the flow chart of FIG. 4. In normal train operation a coded ATP signal will be received by the train; at some time in a continuous series of events the digital filter of FIG. 2 will commence an operational cycle. The received signal is sampled at the 9.6 KHz sampling frequency, the first 64 these time domain samples are digitised by ADC 16 and saved in RAM 21. When sufficient data, i.e. the 64 samples, has been collected CPU 10 initiates execution of the 64 point FFT program stored in ROM 22. As the iterative process of the program progresses the digitised sample values are retrieved from RAM 21 and used in calculating intermediate results which are temporarily stored in the same memory locations in RAM 11. In the last iteration the final results are again temporarily stored in the same locations in preparation for retrieval by the output interface unit 24.

Identification of both carrier and modulation frequency may be by means of sequential operations in which the fist operation searches for the carrier and execution of the second operation to find the modulation frequency is subject to positive detection of the carrier. Alternatively the two transform search operations may be performed simultaneously but the results are examined for the carrier first and only for the modulation frequency if successful.

As the carrier signal has 100% square ware modulation at the selected code signal frequency it is necessary to sample the ATP waveform for a time period equal to the maximum modulation period and perform 64 point transforms on consecutive blocks of 64 time domain samples starting with the first time domain sample. For the modulation frequencies quoted this corresponds to sampling the ATP carrier ($8 \times 64 =$) 512 times at a sampling frequency of 9.6 KHz. Providing at least one of these FFT computations produces a valid carrier spectrum the digital filter program moves on to its modulation code detection phase.

If no carrier signal is found a "carrier out of band" alarm is raised and the carrier search cycle is repeated. On the other hand if the carrier is detected the digital filter program moves into its modulation code detection phase. As the effective sampling rate now needs to be much lower only every 65th digitised sample is saved in RAM 21. When 64 of such samples have been collected the 64 point FFT algorithm program is again executed and the frequency spectrum provided by the final results is examined for a modulation code signal which, if found, sets the maximum speed limit for the ATP system. This interpretation is graphically represented in FIG. 5 in which signal amplitude is the vertical axis and the adjacent frequency bins are laid out along the horizontal axis. For completeness the results for signals containing each of the modulation codes are superimposed on each other in the drawing.

The frequency spectrum is also checked to determine if only one modulation code is present in the received signal. If two or more codes are detected a "mixed modulation ∞ alarm is energised and the ATP system reacts in a fail-safe manner by adopting the lowest speed limit indicated by the detected codes or calling for the train to be halted.

In the carrier search phases data sample collection occupies 53.3 mS execution of the FFT program 25 mS. Thus, the filter detects and identifies a received carrier in not more than 196 mS. Further data collection for code identification occupies 442 mS in total, if some of the carrier search data points are retained, this period would be total elapsed time. However to economise on memory size fresh data is collected as all the earlier data points are discarded in the FFT program. The FFT program again takes 25 mS to execute so that a code signal is identified in not more than 800 mS. This permits a total operational cycle time of approximately one second during which data is collected, stored internally and analysed by the filter which is able to complete all these tasks as cyclically contiguous operational phases.

Having thus described our invention what we claim is:

1. A railway signalling receiver responsive to signals carried by track rails, said receiver comprising:

sensing means cooperating with the track rails for sensing the signals carred by the track rails, means for sampling a sensed signal at a predetermined sampling rate to provide a multiplicity of samples and means for converting the value of each of said samples into a digital word so as to provide over a period of time a multiplicity of digital data words representing a series of time domain samples of the sensed signal;

means for performing a heterodyne operation on the sensed signal including a multiplier means, having a first input connected to means for supplying a multiplication factor corresponding to the value of a cosine function, for multiplying said first and second inputs to provide an output comprising a heterodyned data word, data memory means for receiving and storing a multiplicity of said heterodyned data words, means for performing a discrete Fourier transform using as input data said multiplicity of heterodyned data words and including processing means for performing a predetermined mathematical operation, and a program memory means containing a sequence of processor instructions for evaluating an algorithm for said discrete Fourier transform, said program memory means being connected to control the operation of the processing means, memory addressing means for interconnecting the data memory means and the processing means so as to input data to the processing means for storing intermediate and final results from the processing means produced by evaluation of the transform algorithm, and means, connected to the memory addressing means and responsive to said final frequency domain results, for identifying the frequency components of the signal sensed by signal sensing means.

2. A received as claimed in claim 1 wherein the means for performing a heterodyne operation includes means for providing a multiplication factor corresponding to the value of a cosine function having a frequency equal to four times the sampling rate.

3. A receiver as claimed in claim 2 wherein the multiplication factor corresponds to the value of a normalized cosine function, and the means for providing the multiplication factor is operative to provide alternately factors equal to the value of the function at its quadrature points.

4. A receiver as claimed in claim 1 wherein the means responsive to the final results includes means for identifying the components of a received signal having a component signal and a modulation component, and including means responsive to a final output in the frequency domain corresponding to a heterodyned frequency of the carrier component and a heterodyned frequency of the modulation component, and having an amplitude greater than a predetermined level.

5. A receiver as claimed in claim 1 wherein operation is provided in first and second sequential stages for identifying a carrier signal having a first frequency and a carrier signal modulation frequency having a second frequency relatively lower than the first frequency; the processing means in the first stage performing a discrete Fourier transform using input data samples taken over a period of time equal to a maximum modulation period of the signal, and said means for identifying the frequency domain results acting during the first stage to identify a carrier frequency signal; and the processing means, in the second stage, performing a discrete Fourier transform using for input data samples taken at a relatively lower sampling rate, and the means for identifying the frequency domain results acting in the second stage to identify a modulation frequency signal.

6. A receiver as claimed in claim 1 wherein said means for performing the discrete Fourier transform calculates a result including an amplitude component and a phase component, said program memory means being arranged to store both amplitude and phase components, and said means responsive to the final frequency domain results includes means for calculating the phase angle of a modulation signal relative to the phase of a carrier signal including means for detecting a frequency shift key signal having an orthogonal phase relative to a carrier signal and for producing a receiver output if a frequency shift key signal is detected.

* * * * *